(12) United States Patent
Opris et al.

(10) Patent No.: US 9,069,006 B2
(45) Date of Patent: Jun. 30, 2015

(54) SELF TEST OF MEMS GYROSCOPE WITH ASICS INTEGRATED CAPACITORS

(71) Applicant: Fairchild Semiconductor Corporation, San Jose, CA (US)

(72) Inventors: Ion Opris, San Jose, CA (US); Justin Seng, San Jose, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 390 days.

(21) Appl. No.: 13/765,068

(22) Filed: Feb. 12, 2013

(65) Prior Publication Data

US 2013/0263641 A1 Oct. 10, 2013

Related U.S. Application Data

(60) Provisional application No. 61/620,575, filed on Apr. 5, 2012.

(51) Int. Cl.
  *G01P 21/00* (2006.01)
  *G01P 21/02* (2006.01)
  *G01C 19/00* (2013.01)
  *G01C 25/00* (2006.01)
  *G01C 19/5776* (2012.01)

(52) U.S. Cl.
  CPC .............. *G01P 21/00* (2013.01); *G01C 25/005* (2013.01); *G01P 21/02* (2013.01); *G01C 25/00* (2013.01); *G01C 19/5776* (2013.01)

(58) Field of Classification Search
  USPC ................... 73/1.37–1.38, 1.77–1.78, 504.02, 73/504.08–504.09, 504.2, 865.9; 702/116, 702/204
  See application file for complete search history.

(56) References Cited

U.S. PATENT DOCUMENTS

| 4,896,156 A | 1/1990 | Garverick |
| 5,487,305 A | 1/1996 | Ristic et al. |
| 5,491,604 A | 2/1996 | Nguyen et al. |
| 5,600,064 A | 2/1997 | Ward |
| 5,723,790 A | 3/1998 | Andersson |
| 5,751,154 A | 5/1998 | Tsugai |

(Continued)

FOREIGN PATENT DOCUMENTS

| CN | 1389704 A | 1/2003 |
| CN | 1816747 A | 8/2006 |

(Continued)

OTHER PUBLICATIONS

"U.S. Appl. No. 12/849,742, Response filed Jan. 23, 2012 to Non Final Office Action mailed Aug. 23, 2012", 10 pgs.

(Continued)

*Primary Examiner* — Eric S McCall
*Assistant Examiner* — Anthony W Megna Fuentes
(74) *Attorney, Agent, or Firm* — Schwegman Lundberg & Woessner, P.A.

(57) ABSTRACT

An apparatus includes a MEMS gyroscope sensor including a first sensing capacitor and a second sensing capacitor and an IC. The IC includes a switch circuit configured to electrically decouple the first sensing capacitor from a first input of the IC and electrically couple the second sensing capacitor to a second input of the IC, and a capacitance measurement circuit configured to measure capacitance of the second sensing capacitor of the MEMS gyroscope sensor during application of a first electrical signal to the decoupled first capacitive element.

20 Claims, 4 Drawing Sheets

(56) References Cited

U.S. PATENT DOCUMENTS

| | | |
|---|---|---|
| 5,760,465 A | 6/1998 | Alcoe et al. |
| 5,765,046 A | 6/1998 | Watanabe et al. |
| 6,131,457 A | 10/2000 | Sato |
| 6,214,644 B1 | 4/2001 | Glenn |
| 6,301,965 B1 | 10/2001 | Chu et al. |
| 6,351,996 B1 | 3/2002 | Nasiri et al. |
| 6,366,468 B1 | 4/2002 | Pan |
| 6,390,905 B1 | 5/2002 | Korovin et al. |
| 6,501,282 B1 | 12/2002 | Dummermuth et al. |
| 6,504,385 B2 | 1/2003 | Hartwell |
| 6,553,835 B1 | 4/2003 | Hobbs et al. |
| 6,722,206 B2 | 4/2004 | Takada |
| 6,725,719 B2 | 4/2004 | Cardarelli |
| 6,781,231 B2 | 8/2004 | Minervini |
| 6,848,304 B2 | 2/2005 | Geen |
| 7,051,590 B1 | 5/2006 | Lemkin et al. |
| 7,054,778 B2 | 5/2006 | Geiger et al. |
| 7,093,487 B2 | 8/2006 | Mochida |
| 7,166,910 B2 | 1/2007 | Minervini et al. |
| 7,202,552 B2 | 4/2007 | Zhe et al. |
| 7,210,351 B2 | 5/2007 | Lo et al. |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie |
| 7,266,349 B2 | 9/2007 | Kappes |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,358,151 B2 | 4/2008 | Araki et al. |
| 7,436,054 B2 | 10/2008 | Zhe |
| 7,449,355 B2 | 11/2008 | Lutz et al. |
| 7,451,647 B2 | 11/2008 | Matsuhisa et al. |
| 7,454,967 B2 | 11/2008 | Skurnik |
| 7,518,493 B2 | 4/2009 | Bryzek et al. |
| 7,539,003 B2 | 5/2009 | Ray et al. |
| 7,595,648 B2 | 9/2009 | Ungaretti et al. |
| 7,600,428 B2 | 10/2009 | Robert et al. |
| 7,616,078 B2 | 11/2009 | Prandi et al. |
| 7,622,782 B2 | 11/2009 | Chu et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,859,352 B2 | 12/2010 | Sutton |
| 7,950,281 B2 | 5/2011 | Hammerschmidt |
| 8,004,354 B1 | 8/2011 | Pu et al. |
| 8,006,557 B2 | 8/2011 | Yin et al. |
| 8,037,755 B2 | 10/2011 | Nagata et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,375,789 B2 | 2/2013 | Prandi et al. |
| 8,421,168 B2 | 4/2013 | Allen et al. |
| 8,476,970 B2 | 7/2013 | Mokhtar et al. |
| 8,508,290 B2 | 8/2013 | Elsayed et al. |
| 8,710,599 B2 | 4/2014 | Marx et al. |
| 8,739,626 B2 | 6/2014 | Acar |
| 8,742,964 B2 | 6/2014 | Kleks et al. |
| 8,754,694 B2 | 6/2014 | Opris et al. |
| 8,813,564 B2 | 8/2014 | Acar |
| 2002/0021059 A1 | 2/2002 | Knowles et al. |
| 2002/0117728 A1 | 8/2002 | Brosnihan et al. |
| 2002/0178831 A1 | 12/2002 | Takada |
| 2002/0189352 A1 | 12/2002 | Reeds, III et al. |
| 2002/0196445 A1 | 12/2002 | McClary et al. |
| 2003/0038415 A1 | 2/2003 | Anderson et al. |
| 2003/0061878 A1 | 4/2003 | Pinson |
| 2003/0200807 A1 | 10/2003 | Hulsing, II |
| 2003/0222337 A1 | 12/2003 | Stewart |
| 2004/0119137 A1 | 6/2004 | Leonardi et al. |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matsuhisa |
| 2005/0005698 A1 | 1/2005 | McNeil et al. |
| 2005/0097957 A1 | 5/2005 | McNeil et al. |
| 2005/0139005 A1 | 6/2005 | Geen |
| 2005/0189635 A1 | 9/2005 | Humpston et al. |
| 2005/0274181 A1 | 12/2005 | Kutsuna et al. |
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0097331 A1 | 5/2006 | Hattori |
| 2006/0137457 A1 | 6/2006 | Zdeblick |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2007/0013052 A1 | 1/2007 | Zhe et al. |
| 2007/0034005 A1 | 2/2007 | Acar et al. |
| 2007/0040231 A1 | 2/2007 | Harney et al. |
| 2007/0047744 A1 | 3/2007 | Karney et al. |
| 2007/0071268 A1 | 3/2007 | Harney et al. |
| 2007/0085544 A1 | 4/2007 | Viswanathan |
| 2007/0099327 A1 | 5/2007 | Hartzell et al. |
| 2007/0114643 A1 | 5/2007 | DCamp et al. |
| 2007/0165888 A1 | 7/2007 | Weigold |
| 2007/0205492 A1 | 9/2007 | Wang |
| 2007/0220973 A1 | 9/2007 | Acar |
| 2007/0222021 A1 | 9/2007 | Yao |
| 2007/0284682 A1 | 12/2007 | Laming et al. |
| 2008/0049230 A1 | 2/2008 | Chin et al. |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0122439 A1 | 5/2008 | Burdick et al. |
| 2008/0157238 A1 | 7/2008 | Hsiao |
| 2008/0157301 A1 | 7/2008 | Ramakrishna et al. |
| 2008/0169811 A1 | 7/2008 | Viswanathan |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0290756 A1 | 11/2008 | Huang |
| 2008/0302559 A1 | 12/2008 | Leedy |
| 2008/0314147 A1 | 12/2008 | Nasiri et al. |
| 2009/0064780 A1 | 3/2009 | Coronato et al. |
| 2009/0072663 A1 | 3/2009 | Ayazi et al. |
| 2009/0140606 A1 | 6/2009 | Huang |
| 2009/0166827 A1 | 7/2009 | Foster et al. |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0263937 A1 | 10/2009 | Ramakrishna et al. |
| 2009/0266163 A1 | 10/2009 | Ohuchi et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0058864 A1 | 3/2010 | Hsu et al. |
| 2010/0072626 A1 | 3/2010 | Theuss et al. |
| 2010/0089154 A1 | 4/2010 | Ballas et al. |
| 2010/0122579 A1 | 5/2010 | Hsu et al. |
| 2010/0155863 A1 | 6/2010 | Weekamp |
| 2010/0206074 A1 | 8/2010 | Yoshida et al. |
| 2010/0212425 A1 | 8/2010 | Hsu et al. |
| 2010/0224004 A1 | 9/2010 | Suminto et al. |
| 2010/0236327 A1 | 9/2010 | Mao et al. |
| 2011/0023605 A1* | 2/2011 | Tripoli et al. .............. 73/514.32 |
| 2011/0030473 A1 | 2/2011 | Acar |
| 2011/0030474 A1 | 2/2011 | Kuang et al. |
| 2011/0031565 A1 | 2/2011 | Marx et al. |
| 2011/0094302 A1 | 4/2011 | Schofield et al. |
| 2011/0120221 A1 | 5/2011 | Yoda |
| 2011/0121413 A1 | 5/2011 | Allen et al. |
| 2011/0146403 A1 | 6/2011 | Rizzo Piazza Roncoroni et al. |
| 2011/0265564 A1 | 11/2011 | Acar et al. |
| 2011/0285445 A1 | 11/2011 | Huang et al. |
| 2013/0139591 A1 | 6/2013 | Acar |

(56) References Cited

U.S. PATENT DOCUMENTS

| | | |
|---|---|---|
| 2013/0139592 A1 | 6/2013 | Acar |
| 2013/0192364 A1 | 8/2013 | Acar |
| 2013/0192369 A1 | 8/2013 | Acar et al. |
| 2013/0247666 A1 | 9/2013 | Acar |
| 2013/0247668 A1 | 9/2013 | Bryzek |
| 2013/0250532 A1 | 9/2013 | Bryzek et al. |
| 2013/0257487 A1 | 10/2013 | Opris et al. |
| 2013/0269413 A1 | 10/2013 | Tao et al. |
| 2013/0270657 A1 | 10/2013 | Acar et al. |
| 2013/0270660 A1 | 10/2013 | Bryzek et al. |
| 2013/0271228 A1 | 10/2013 | Tao et al. |
| 2013/0277772 A1 | 10/2013 | Bryzek et al. |
| 2013/0277773 A1 | 10/2013 | Bryzek et al. |
| 2013/0298671 A1 | 11/2013 | Acar et al. |
| 2013/0328139 A1 | 12/2013 | Acar |
| 2013/0341737 A1 | 12/2013 | Bryzek et al. |
| 2014/0070339 A1 | 3/2014 | Marx |

FOREIGN PATENT DOCUMENTS

| | | |
|---|---|---|
| CN | 1948906 A | 4/2007 |
| CN | 101038299 A | 9/2007 |
| CN | 101180516 A | 5/2008 |
| CN | 101270988 A | 9/2008 |
| CN | 101426718 A | 5/2009 |
| CN | 101813480 A | 8/2010 |
| CN | 101858928 A | 10/2010 |
| CN | 102597699 A | 7/2012 |
| CN | 103209922 A | 7/2013 |
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| CN | 103363969 A | 10/2013 |
| CN | 103363983 A | 10/2013 |
| CN | 103364590 A | 10/2013 |
| CN | 103364593 A | 10/2013 |
| CN | 103368503 A | 10/2013 |
| CN | 103368562 A | 10/2013 |
| CN | 103368577 A | 10/2013 |
| CN | 103376099 A | 10/2013 |
| CN | 103376102 A | 10/2013 |
| CN | 103403495 A | 11/2013 |
| CN | 203275441 U | 11/2013 |
| CN | 203275442 U | 11/2013 |
| CN | 103663344 A | 3/2014 |
| CN | 203719664 U | 7/2014 |
| CN | 104094084 A | 10/2014 |
| CN | 104105945 A | 10/2014 |
| DE | 112011103124 T5 | 12/2013 |
| DE | 102013014881 A1 | 3/2014 |
| EP | 1460380 A1 | 9/2004 |
| EP | 1521086 A1 | 4/2005 |
| EP | 1688705 A2 | 8/2006 |
| EP | 1832841 A1 | 9/2007 |
| EP | 1860402 A1 | 11/2007 |
| EP | 2053413 A1 | 4/2009 |
| EP | 2259019 A1 | 12/2010 |
| JP | 09089927 A | 4/1997 |
| JP | 10239347 A | 9/1998 |
| JP | 2005024310 A | 1/2005 |
| JP | 2005114394 A | 4/2005 |
| JP | 2005294462 A | 10/2005 |
| JP | 2007024864 A | 2/2007 |
| JP | 2008294455 A | 12/2008 |
| JP | 2009075097 A | 4/2009 |
| JP | 2009186213 A | 8/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 101311966 B1 | 9/2013 |
| KR | 1020130097209 A | 9/2013 |
| KR | 101318810 B1 | 10/2013 |
| KR | 1020130037462 A | 10/2013 |
| KR | 1020130112789 A | 10/2013 |
| KR | 1020130112792 A | 10/2013 |
| KR | 1020130112804 A | 10/2013 |
| KR | 1020130113385 A | 10/2013 |
| KR | 1020130113386 A | 10/2013 |
| KR | 1020130113391 A | 10/2013 |
| KR | 1020130116189 A | 10/2013 |
| KR | 1020130116212 A | 10/2013 |
| KR | 101332701 B1 | 11/2013 |
| KR | 1020130139914 A | 12/2013 |
| KR | 1020130142116 A | 12/2013 |
| KR | 101352827 B1 | 1/2014 |
| KR | 1020140034713 A | 3/2014 |
| TW | I255341 B | 5/2006 |
| WO | WO-0175455 A2 | 10/2001 |
| WO | WO-2008059757 A1 | 5/2008 |
| WO | WO-2008087578 A2 | 7/2008 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |
| WO | WO-2012037537 A2 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,787, Non Final Office Action mailed May 28, 2013", 18 pgs.

"U.S. Appl. No. 12/947,543, Notice of Allowance mailed Dec. 17, 2012", 11 pgs.

"U.S. Appl. No. 13/813,443, Preliminary Amendment mailed Jan. 31, 2013", 3 pgs.

"U.S. Appl. No. 13/821,586, Preliminary Amendment mailed Mar. 8, 2013", 6 pgs.

"U.S. Appl. No. 13/821,589, Preliminary Amendment mailed Mar. 8, 2013", 6 pgs.

"U.S. Appl. No. 13/821,598, Preliminary Amendment mailed Mar. 8, 2013", 7 pgs.

"U.S. Appl. No. 13/821,609, Preliminary Amendment mailed Mar. 8, 2013", 3 pgs.

"U.S. Appl. No. 13/821,612, Preliminary Amendment mailed Mar. 8, 2013", 3 pgs.

"U.S. Appl. No. 13/821,619, Preliminary Amendment mailed Mar. 8, 2013", 3 pgs.

"U.S. Appl. No. 13/821,793, Preliminary Amendment mailed Mar. 8, 2013", 3 pgs.

"U.S. Appl. No. 13/821,842, Preliminary Amendment mailed Mar. 8, 2013", 3 pgs.

"U.S. Appl. No. 13/821,853, Preliminary Amendment mailed Mar. 8. 2013", 3 pgs.

(56) References Cited

OTHER PUBLICATIONS

"Application Serial No. PCT/US2011/051994, International Republished Application mailed Jun. 7, 2012", 1 pg.
"DigiSiMic™ Digital Silicon Microphone Pulse Part No. TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability mailed Mar. 28, 2013", 8 pgs.
"International Application Serial No. PCT/US2011/052340, International Preliminary Report on Patentability mailed Apr. 4, 2013", 5 pgs.
"International Application Serial No. PCT/US2011/052340, Search Report mailed Feb. 29, 2012", 3 pgs.
"International Application Serial No. PCT/US2011/052340, Written Opinion mailed Feb. 29, 2012", 3 pgs.
"International Application Serial No. PCT/US2011/052369, International Preliminary Report on Patentability mailed Apr. 4, 2013", 5 pgs.
"International Application Serial No. PCT/US2013/021411, International Search Report mailed Apr. 30, 2013", 5 pgs.
"International Application Serial No. PCT/US2013/021411, Written Opinion mailed Apr. 30, 2013", 5 pgs.
"International Application Serial No. PCT/US2013/023877, International Search Report mailed May 14, 2013", 3 pgs.
"International Application Serial No. PCT/US2013/023877, Written Opinion mailed May 14, 2013", 5 pgs.
"International Application Serial No. PCT/US2013/024149, Written Opinion mailed", 4 pages.
"International Application Serial No. PCT/US2013/024149, International Search Report mailed", 7 pages.
"T4020 & T4030 MEMS Microphones for Consumer Electronics", Product Brief 2010, Edition Feb. 2010, (2010), 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair A look at some recent history of multi-chip and through silicon via (TSV) technology", Chip Design Magazine, (Oct./Nov. 2008), 7 pgs.
"U.S. Appl. No. 12/849,742, Supplemental Notice of Allowability mailed Mar. 17, 2014", 3 pgs.
"U.S. Appl. No. 12/849,742, Supplemental Notice of Allowability mailed May 5, 2014", 2 pgs.
"U.S. Appl. No. 12/849,787, Supplemental Notice of Allowability mailed Mar. 21, 2014", 3 pgs.
"U.S. Appl. No. 13/362,955, Non Final Office Action mailed Apr. 15, 2014", 9 pgs.
"U.S. Appl. No. 13/363,537, Response filed Jun. 6, 2014 to Non Final Office Action mailed Feb. 6, 2014", 11 pgs.
"U.S. Appl. No. 13/742,942, Supplemental Notice of Allowability mailed Apr. 10, 2014", 2 pgs.
"U.S. Appl. No. 13/755,841, Notice of Allowance mailed May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement mailed Feb. 21, 2014", 7 pgs.
"U.S. Appl. No. 13/821,589, Restriction Requirement mailed Apr. 11, 2014", 10 pgs.
"Chinese Application Serial No. 2010800423190, Office Action mailed Mar. 26, 2014", 10 pgs.
"Chinese Application Serial No. 201180053926.1, Response filed Apr. 29, 2014 to Office Action mailed Jan. 13, 2014", w/English Claims, 10 pgs.
"Chinese Application Serial No. 201180055029.4, Response filed May 27, 2014 to Office Action mailed Jan. 13, 2014", w/English Claims, 29 pgs.
"Chinese Application Serial No. 201180055309.5, Office Action mailed Mar. 31, 2014", w/English Claims, 7 pgs.
"Chinese Application Serial No. 201320172366.8, Office Action mailed Jan. 30, 2014", w/English Claims, 3 pgs.
"Chinese Application Serial No. 201320172366.8, Response filed Mar. 18, 2014 to Office Action mailed Jan. 30, 2014", w/English Claims, 20 pgs.
"Chinese Application Serial No. 201320565239.4, Response filed Mar. 31, 2014 to Office Action mailed Jan. 16, 2014", w/English Claims, 38 pgs.
"European Application Serial No. 118260070.2, Office Action mailed Mar. 12, 2014", 1 pg.
"European Application Serial No. 11826070.2, Extended European Search Report mailed Feb. 21, 2014", 5 pgs.
"European Application Serial No. 11826071.0, Extended European Search Report mailed Feb. 20, 2014", 6 pgs.
"European Application Serial No. 11826071.0, Office Action mailed Mar. 12, 2014", 1 pg.
"European Application Serial No. 13001692.6, Response filed Apr. 1, 2014 to Extended European Search Report mailed Jul. 24, 2013", 19 pgs.
"European Application Serial No. 13001721.3, Response filed Apr. 7, 2014 to Extended European Search Report mailed Jul. 18, 2013", 25 pgs.
"Korean Application Serial No. 10-2013-7009777, Response filed Apr. 28, 2014", w/English Claims, 19 pgs.
"U.S. Appl. No. 13/363,537, Final Office Action mailed Jun. 27, 2014", 8 pgs.
"U.S. Appl. No. 13/742,942, Notice of Allowance mailed Jan. 28, 2014", 8 pgs.
"U.S. Appl. No. 13/755,841, Supplemental Notice of Allowability Jun. 27, 2014", 2 pgs.
"U.S. Appl. No. 13/821,589, Non Final Office Action mailed Jul. 9, 2014", 10 pgs.
"U.S. Appl. No. 13/821,589, Response to Restriction Requirement mailed Apr. 11, 2014", 6 pgs.
"U.S. Appl. No. 13/821,598, Restriction Requirement mailed Aug. 15, 2014", 11 pgs.
"U.S. Appl. No. 13/821,612, Non Final Office Action mailed Jul. 23, 2014", 8 pgs.
"U.S. Appl. No. 13/821,853, Non Final Office Action mailed Jul. 30, 2014", 10 pgs.
"U.S. Appl. No. 13/860,761, Non Final Office Action mailed Aug. 19, 2014", 13 pgs.
"Chinese Application Serial No. 2010800423190, Response filed Aug. 11, 2014 to Office Action mailed Mar. 26, 2014", w/English Claims, 11 pgs.
"Chinese Application Serial No. 201180054796.3, Response filed Jun. 30, 2014 to Office Action mailed Jan. 16, 2014", w/English Claims, 3 pgs.
"Chinese Application Serial No. 201180055029.4, Office Action mailed Jul. 2, 2014", w/English Translation, 5 pgs.
"Chinese Application Serial No. 201180055309.5, Response filed Aug. 13, 2014 to Office Action mailed Mar. 31, 2014", w/English Claims, 27 pgs.
"Chinese Application Serial No. 201380007588.7, Notification to Make Rectification mailed Aug. 18, 2014", 2 pgs.
"Chinese Application Serial No. 201380007615.0, Notification to Make Rectification mailed Aug. 18, 2014", 2 pgs.
"European Application Serial No. 10806751.3, Response filed Jul. 24, 2014 to Office Action mailed Jan. 24, 2014", 26 pgs.

(56) References Cited

OTHER PUBLICATIONS

"European Application Serial No. 11826068.6, Extended European Search Report mailed Jul. 16, 2014", 10 pgs.
"European Application Serial No. 13001719.7, Extended European Search Report mailed Jun. 24, 2014", 10 pgs.
"International Application Serial No. PCT/US2013/021411, International Preliminary Report on Patentability mailed Aug. 14, 2014", 7 pgs.
"International Application Serial No. PCT/US2013/023877, International Preliminary Report on Patentability mailed Aug. 14, 2014", 7 pgs.
"International Application Serial No. PCT/US2013/024138, International Preliminary Report on Patentability mailed Aug. 14, 2014", 6 pgs.
"International Application Serial No. PCT/US2013/024149, International Preliminary Report on Patentability mailed Aug. 14, 2014", 6 pgs.
Xia, Guo-Ming, et al., "Phase correction in digital self-oscillation drive circuit for improve silicon MEMS gyroscope bias stability", Solid-State and Integrated Circuit Technology (ICSICT), 2010 10th IEEE International Conference on, IEEE, (Nov. 1 2010), 1416-1418.
"U.S. Appl. No. 12/849,742, Response filed Sep. 30, 2013 to Non-Final Office Action mailed Mar. 28, 2013", 12 pgs.
"Chinese Application Serial No. 201180053926.1, Amendment filed Aug. 21, 2013", w/English Translation, 13 pgs.
"Chinese Application Serial No. 201180055309.5, Voluntary Amendment filed Aug. 23, 2013", w/English Translation, 13 pgs.
"Chinese Application Serial No. 201320165465.3, Office Action mailed Jul. 22, 2013", w/English Translation, 2 pgs.
"Chinese Application Serial No. 201320165465.3, Response filed Aug. 7, 2013 to Office Action mailed Jul. 22, 2013", w/English Translation, 39 pgs.
"Chinese Application Serial No. 201320171504.0, Office Action mailed Jul. 22, 2013", w/English Translation, 3 pgs.
"Chinese Application Serial No. 201320171504.0, Response filed Jul. 25, 2013 to Office Action mailed Jul. 22, 2013", w/English Translation, 33 pgs.
"Chinese Application Serial No. 201320171616.6, Office Action mailed Jul. 10, 2013", w/English Translation, 2 pgs.
"Chinese Application Serial No. 201320171757.8, Office Action mailed Jul. 11, 2013", w/English Translation, 2 pgs.
"Chinese Application Serial No. 201320171757.8, Response filed Jul. 25, 2013 to Office Action mailed Jul. 11, 2013", w/English Translation, 21 pgs.
"Chinese Application Serial No. 201320171757.8, Response filed Jul. 26, 2013 to Office Action mailed Jul. 10, 2013", w/English Translation, 40 pgs.
"Chinese Application Serial No. 201320172128.7, Office Action mailed Jul. 12, 2013", w/English Translation, 3 pgs.
"Chinese Application Serial No. 201320172128.7, Response filed Aug. 7, 2013 to Office Action mailed Jul. 12, 2013", w/English Translation, 39 pgs.
"Chinese Application Serial No. 201320172366.8, Office Action mailed Jul. 9, 2013", w/English Translation, 3 pgs.
"Chinese Application Serial No. 201320172366.8, Response filed Sep. 16, 2013 to Office Action mailed Jul. 9, 2013", w/English Translation, 24 pgs.
"Chinese Application Serial No. 201320172367.2, Office Action mailed Jul. 9, 2013", w/English Translation, 2 pgs.
"Chinese Application Serial No. 201320172367.2, Response filed Sep. 16, 2013 to Office Action mailed Jul. 9, 2013", w/English Translation, 24 pgs.
"Chinese Application Serial No. 201320185461.1, Office Action mailed Jul. 23, 2013", w/English Translation, 3 pgs.
"Chinese Application Serial No. 201320185461.1, Response filed Sep. 10, 2013 to Office Action mailed Jul. 23, 2013", w/English Translation, 25 pgs.
"Chinese Application Serial No. 201320186292.3, Office Action mailed Jul. 19, 2013", w/English Translation, 2 pgs.
"Chinese Application Serial No. 201320186292.3, Response filed Sep. 10, 2013 to Office Action mailed Jul. 19, 2013", w/English Translation, 23 pgs.
"European Application Serial No. 13001692.6, European Search Report mailed 07-13-24", 5 pgs.
"European Application Serial No. 13001696.7, Extended European Search Report mailed Aug. 6. 2013", 4 pgs.
"European Application Serial No. 13001721.3, European Search Report mailed Jul. 18, 2013", 9 pgs.
"International Application Serial No. PCT/US2013/024138, International Search Report mailed May 24, 2013", 3 pgs.
"International Application Serial No. PCT/US2013/024138, Written Opinion mailed May 24, 2013", 4 pgs.
"Korean Application Serial No. 10-2013-7009775, Office Action mailed Sep. 17, 2013", w/English Translation, 6 pgs.
"Korean Application Serial No. 10-2013-7009777, Office Action mailed Sep. 17, 2013", w/English Translation, 8 pgs.
"Korean Application Serial No. 10-2013-7009788, Office Action mailed Aug. 29, 2013", w/English Translation, 6 pgs.
"Korean Application Serial No. 10-2013-7009790, Office Action mailed Jun. 26, 2013", W/English Translation, 7 pgs.
"Korean Application Serial No. 10-2013-7009790, Response filed Aug. 26, 2013 to Office Action mailed Jun. 26, 2013", w/English Claims, 11 pgs.
"Korean Application Serial No. 10-2013-7010143, Office Action mailed May 28, 2013", w/English Translation, 5 pgs.
"Korean Application Serial No. 10-2013-7010143, Response filed Jul. 24, 2013 to Office Action mailed May 28, 2013", w/English Claims, 14 pgs.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mitedu/bitstream/handle/1721.1/16682/57138272.pdf? . . . >, (Jan. 1, 2004), 123 pgs.
"U.S. Appl. No. 13/362,955, Final Office Action mailed Nov. 19, 2014", 5 pgs.
"U.S. Appl. No. 13/362,955, Response filed Aug. 15, 2014 to Non Final Office Action mailed May 15, 2014", 13 pgs.
"U.S. Appl. No. 13/363,537, Examiner Interview Summary mailed Sep. 29, 2014", 3 pgs.
"U.S. Appl. No. 13/363,537, Notice of Allowance mailed Nov. 7, 2014", 5 pgs.
"U.S. Appl. No. 13/363,537, Response filed Sep. 29, 2014 to Final Office Action mailed Jun. 27, 2014", 9 pgs.
"U.S. Appl. No. 13/821,586, Response filed Nov. 24, 2014 to Restriction Requirement mailed Sep. 22, 2014", 6 pgs.
"U.S. Appl. No. 13/821,586, Restriction Requirement mailed Sep. 22, 2014", 4 pgs.
"U.S. Appl. No. 13/821,589, Response filed Nov. 10, 2014 to Non Final Office Action mailed Jul. 9, 2014", 15 pgs.
"U.S. Appl. No. 13/821,598, Non Final Office Action mailed Nov. 20, 2014", 9 pgs.
"U.S. Appl. No. 13/821,598, Response filed Oct. 15, 2014 to Restriction Requirement mailed Aug. 15, 2014", 8 pgs.
"U.S. Appl. No. 13/821,612, Response filed Oct. 23, 2014 to Non Final Office Action mailed Jul. 23, 2014", 6 pgs.
"Chinese Application Serial No. 201180054796.3, Office Action mailed Sep. 4, 2014", w/English Claims, 11 pgs.
"Chinese Application Serial No. 201180055029.4, Response filed Nov. 14, 2014 to Office Action mailed Jul. 2, 2014", w/English Claims, 23 pgs.

(56) References Cited

OTHER PUBLICATIONS

"Chinese Application Serial No. 201310118845.6, Office Action mailed Sep. 9, 2014", 8 pgs.
"Chinese Application Serial No. 201310119472.4, Office Action mailed Sep. 9, 2014", w/English Translation, 11 pgs.
"European Application Serial No. 11826043.9, Office Action mailed May 6, 2013", 2 pgs.
"European Application Serial No. 11826043.9, Response filed Nov. 4, 2013 to Office Action mailed May 6, 2013", 6 pgs.
"European Application Serial No. 11826067.8, Extended European Search Report mailed Oct. 6, 2014", 10 pgs.
"European Application Serial No. 11826070.2, Response filed Sep. 19, 2014 to Office Action mailed Mar. 12, 2014", 11 pgs.
"European Application Serial No. 11826071.0, Response filed Sep. 19, 2014 to Office Action mailed Mar. 12, 2014", 20 pgs.
"European Application Serial No. 11827347.3, Office Action mailed May 2, 2013", 6 pgs.
"European Application Serial No. 11827347.3, Response filed Oct. 30, 2013 to Office Action mailed May 2, 2013", 9 pgs.
"European Application Serial No. 13001695.9, European Search Report mailed Oct. 5, 2014", 6 pgs.
Dunn, C, et al., "Efficient linearisation of sigma-delta modulators using single-bit dither", Electronics Letters 31(12), (Jun. 1995), 941-942.
Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.
Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.
"U.S. Appl. No. 12/849,742, Notice of Allowance mailed Nov. 29, 2013", 7 pgs.
"U.S. Appl. No. 12/849,787, Notice of Allowance mailed Dec. 11, 2013", 9 pgs.
"U.S. Appl. No. 12/849,787, Response filed Oct. 28, 2013 to Non Final Office Action mailed May 28, 2013", 12 pgs.
"U.S. Appl. No. 13/362,955, Response filed Feb. 17, 2014 to Restriction Requirement mailed Dec. 17, 2013", 9 pgs.
"U.S. Appl. No. 13/362,955, Restriction Requirement mailed Dec. 17, 2013", 6 pgs.
"U.S. Appl. No. 13/363,537, Non Final Office Action mailed Feb. 6, 2014", 10 pgs.
"U.S. Appl. No. 13/742,942, Notice of Allowance mailed Jan. 28, 2014", 9 pgs.
"U.S. Appl. No. 13/746,016, Notice of Allowance mailed Jan. 17, 2014", 10 pgs.
"U.S. Appl. No. 13/755,841, Restriction Requirement mailed Feb. 21, 2014", 6 pgs.
"Chinese Application Serial No. 201180053926.1, Office Action mailed Jan. 13, 2014", 7 pgs.
"Chinese Application Serial No. 201180054796.3, Office Action mailed Jan. 16, 2014", 8 pgs.
"Chinese Application Serial No. 201180055029.4, Office Action mailed Jan. 13, 2014", 7 pgs.
"Chinese Application Serial No. 201320172366.8, Office Action mailed Oct. 25, 2013", 8 pgs.
"Chinese Application Serial No. 201320172366.8, Response filed Dec. 24, 2013 to Office Action mailed Oct. 25, 2013", 11 pgs.
"Chinese Application Serial No. 201320565239.4, Office Action mailed Jan. 16, 2014", w/English Translation, 3 pgs.
"European Application Serial No. 10806751.3, Extended European Search Report mailed Jan. 7, 2014", 7 pgs.
"Korean Application Serial No. 10-2013-0109990, Amendment filed Dec. 10, 2013", 4 pgs.
"Korean Application Serial No. 10-2013-7009775, Office Action mailed Dec. 17, 2013", 8 pgs.
"Korean Application Serial No. 10-2013-7009775, Response filed Oct. 29, 2013 to Office Action mailed Sep. 17, 2013", w/English Claims, 23 pgs.
"Korean Application Serial No. 10-2013-7009777, Office Action mailed Jan. 27, 2014", 5 pgs.
"Korean Application Serial No. 10-2013-7009777, Response filed Nov. 5, 2013 to Office Action mailed Sep. 17, 2013", 11 pgs.
"Korean Application Serial No. 10-2013-7009788, Office Action mailed Dec. 27, 2013", w/English Translation, 10 pgs.
"Korean Application Serial No. 10-2013-7009788, Response filed Oct. 29, 2013 to Office Action mailed Aug, 29, 2013", w/English Claims, 22 pgs.
"U.S. Appl. No. 12/849,742, Non Final Office Action mailed Mar. 28, 2013", 9 pgs.
"U.S. Appl. No. 12/849,742, Non Final Office Action mailed Aug. 23, 2012", 9 pgs.
"U.S. Appl. No. 12/849,787, Response filed Feb. 4, 2013 to Restriction Requirement mailed Oct. 4, 2012", 7 pgs.
"U.S. Appl. No. 12/849,787, Restriction Requirement mailed Oct. 4, 2012", 5 pgs.
"U.S. Appl. No. PCT/US2011/052006, International Republished Application mailed Jun. 7, 2012", 1 pg.
"Application Serial No. PCT/US2011/052417, International Republished Application mailed Jun. 7, 2012", 1 pg.
"International Application Serial No. PCT/US2010/002166, International Preliminary Report on Patentability mailed Feb. 16, 2012", 6 pgs.
"International Application Serial No. PCT/US2010/002166, International Search Report mailed Feb. 28, 2011", 3 pgs.
"International Application Serial No. PCT/US2010/002166, Written Opinion mailed Feb. 28, 2011", 4 pgs.
"International Application Serial No. PCT/US2011/051994, International Search Report mailed Apr. 16, 2012", 3 pgs.
"International Application Serial No. PCT/US2011/051994, Written Opinion mailed Apr. 16, 2012", 6 pgs.
"International Application Serial No. PCT/US2011/052006, International Preliminary Report on Patentability mailed Mar. 28, 2013", 7 pgs.
"International Application Serial No. PCT/US2011/052006, Search Report mailed Apr. 16, 2012", 3 pgs.
"International Application Serial No. PCT/US2011/052006, Written Opinion mailed Apr. 16, 2012", 5 pgs.
"International Application Serial No. PCT/US2011/052059, International Preliminary Report on Patentability mailed Jan. 22, 2013", 14 pgs.
"International Application Serial No. PCT/US2011/052059, Search Report mailed Apr. 20, 2012", 4 pgs.
"International Application Serial No. PCT/US2011/052059, Written Opinion mailed Apr. 20, 2012", 7 pgs.
"International Application Serial No. PCT/US2011/052060, International Preliminary Report on Patentability mailed Jan. 22, 2013", 12 pgs.
"International Application Serial No. PCT/US2011/052060, International Search Report Apr. 20, 2012", 3 pgs.
"International Application Serial No. PCT/US2011/052060, Written Opinion mailed Apr. 20, 2012", 7 pgs.
"International Application Serial No. PCT/US2011/052061, International Preliminary Report on Patentability mailed Mar. 28, 2013", 6 pgs.
"International Application Serial No. PCT/US2011/052061, International Search Report mailed Apr. 10, 2012", 3 pgs.
"International Application Serial No. PCT/US2011/052061, Written Opinion mailed Apr. 10, 2012", 4 pgs.
"International Application Serial No. PCT/US2011/052064, International Preliminary Report on Patentability mailed Mar. 28, 2013", 5 pgs.
"International Application Serial No. PCT/US2011/052064, Search Report mailed Feb. 29, 2012", 3 pgs.
"International Application Serial No. PCT/US2011/052064, Written Opinion mailed Feb. 29, 2012", 3 pgs.
"International Application Serial No. PCT/US2011/052065, International Preliminary Report on Patentability mailed Mar. 28, 2013", 7 pgs.

(56) References Cited

OTHER PUBLICATIONS

"International Application Serial No. PCT/US2011/052065, International Search Report mailed Apr. 10, 2012", 3 pgs.
"International Application Serial No. PCT/US2011/052065, Written Opinion mailed Apr. 10, 2012", 5 pgs.
"International Application Serial No. PCT/US2011/052369, International Search Report mailed Apr. 24, 2012", 6 pgs.
"International Application Serial No. PCT/US2011/052369, Written Opinion mailed Apr. 24, 2012", 3 pgs.
"International Application Serial No. PCT/US2011/052417, International Preliminary Report on Patentability mailed Apr. 4, 2013", 6 pgs.
"International Application Serial No. PCT/US2011/052417, International Search Report mailed Apr. 23, 2012", 5 pgs.
"International Application Serial No. PCT/US2011/052417, Written Opinion mailed Apr. 23, 2012", 4 pgs.
Beyne, E, et al., "Through-silicon via and die stacking technologies for microsystemsintegration", IEEE International Electron Devices Meeting, 2008. IEDM 2008., (Dec. 2008), 1-4.
Cabruja, Enric, et al., "Piezoresistive Accelerometers for MCM-Package—Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://vonweecs.berkeley.edu/Pubs/TechRpts/2007/EECS-2007-176.html, (Dec. 21, 2007), 94 pgs.
Rimskog, Magnus, "Through Wafer Via Technology for MEMS and 3D Integration", 32nd IEEE/CPMT International Electronic Manufacturing Technology Symposium, 2007. IEMT '07., (2007), 286-289.

\* cited by examiner

SELF TEST OF MEMS GYROSCOPE WITH ASICS INTEGRATED CAPACITORS

CLAIM OF PRIORITY

This application claims the benefit of priority under 35 U.S.C. §119(e) of Opris et al., U.S. Provisional Patent Application Ser. No. 61/620,575, filed on Apr. 5, 2012, the benefit of priority of which is claimed hereby, and is incorporated by reference herein in its entirety.

BACKGROUND

Micro-electromechanical systems (MEMS) include small mechanical devices performing electrical and mechanical functions that are fabricated using photo-lithography techniques similar to techniques used to fabricate integrated circuits. Some MEMS devices are sensors that can detect motion such as an accelerometer or detect angular rate such as a gyroscope. A capacitive MEMS gyroscope undergoes a change in capacitance in response to a change in angular rate. Production of MEMS gyroscope sensors involves testing that should quickly detect any faults in the manufactured devices.

OVERVIEW

This document discusses, among other things, devices, systems, and methods to interface with MEMS sensors. An apparatus example includes an IC and a MEMS gyroscope sensor that includes a first sensing capacitor and a second sensing capacitor. The IC includes a switch circuit configured to electrically decouple the first sensing capacitor from a first input of the IC and electrically couple the second sensing capacitor to a second input of the IC, and a capacitance measurement circuit configured to measure capacitance of the second sensing capacitor of the MEMS gyroscope sensor during application of a first electrical signal to the decoupled first capacitive element.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example and not by way of limitation, various embodiments discussed in the present document.

DETAILED DESCRIPTION

Figure 1:
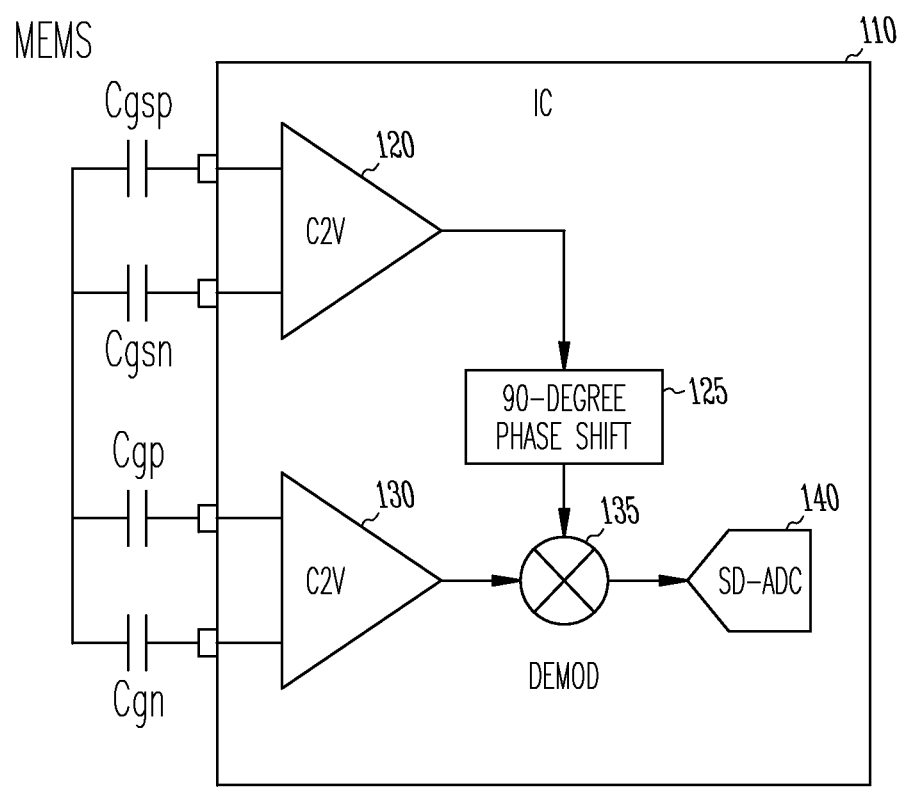
FIG. 1 is an illustration of a block diagram of portions of an example of a MEMS sensor and an integrated circuit.

FIG. 1 is a block diagram of portions of an example of an electronic system that includes a MEMS sensor 105 and an IC 110. The MEMS sensor can include a MEMS gyroscope, such as a vibratory gyroscope for example. A vibratory gyroscope can include a proof mass that is suspended above a substrate. The proof mass oscillates mechanically in a drive direction and in a sense direction orthogonal to the drive direction. The proof mass is driven into resonance in the drive direction by an external drive source. When the gyroscope is subjected to an angular rotation, a Coriolis force or Coriolis effect is induced in the sense direction that is detected using sensing capacitors.

In FIG. 1, the sensing capacitors Cgp and Cgn represent the gyroscope Coriolis sense outputs to the IC 110. Capacitors Cgsp and Cgsn are drive sense capacitors. These capacitors are used to monitor a drive loop included in the MEMS gyroscope sensor 105 and IC 110. The gyro drive loop includes, among other things, the drive capacitors (not shown) of the MEMS gyroscope sensor 105, an output driver amplifier circuit (not shown) of the IC 110 to generate mechanical oscillation of the MEMS gyroscope sensor 105, and an automatic gain control (AGC) circuit (not shown). The AGC circuit adjusts the electrostatic force provided by the output driver amplifier circuit to maintain the mechanical oscillation to a target value. Drive sense capacitors Cgsp and Cgsn are used to sense the amplitude of the oscillation of the MEMS gyroscope sensor 105. The gyro drive loop also includes the top capacitor-to-voltage (C2V) sensor circuit 120 and the phase shift circuit 125. The top C2V sensor circuit 120 converts capacitance of Cgsp and Cgsn to a voltage signal that can be observed to sustain the oscillation maintained by the gyro drive loop.

The bottom C2V sensor circuit 130 converts the capacitance of the Coriolis sensing capacitors Cgp and Cgn to a voltage. The voltage derived from the drive sense capacitors Cgsp and Cgsn and the voltage derived by the Coriolis sensing capacitors Cgp and Cgn are demodulated using mixer circuit 135 and the result is measured using the analog-to-digital converter (ADC) circuit 140. In some examples, the ADC circuit 140 is a sigma-delta ADC circuit.

The example in FIG. 1 only shows one set of drive sense capacitors and one set of Coriolis sensing capacitors. A multi-axis MEMS gyroscope sensor may include a set of drive sense capacitors and a set of Coriolis sensing capacitors for each axis. For example, a three-axis MEMS gyroscope sensor may include a set of drive sense capacitors and a set of Coriolis sensing capacitors for each of the X, Y, and Z axes.

To test the MEMS gyroscope sensor 105, advantage can be taken of the fact that capacitive MEMS sensors can also be used as actuators. Typically, capacitors are added to the MEMS sensors that are used when the device is operated in a test mode to add electrostatic charge and drive the proof mass. This testing approach requires the additional capacitors and additional electrical contacts to be fabricated on the MEMS sensor. A better approach is to use the sensing capacitors themselves in the testing. This simplifies the design of the MEMS gyroscope sensor by eliminating components dedicated to testing.

Figure 2:
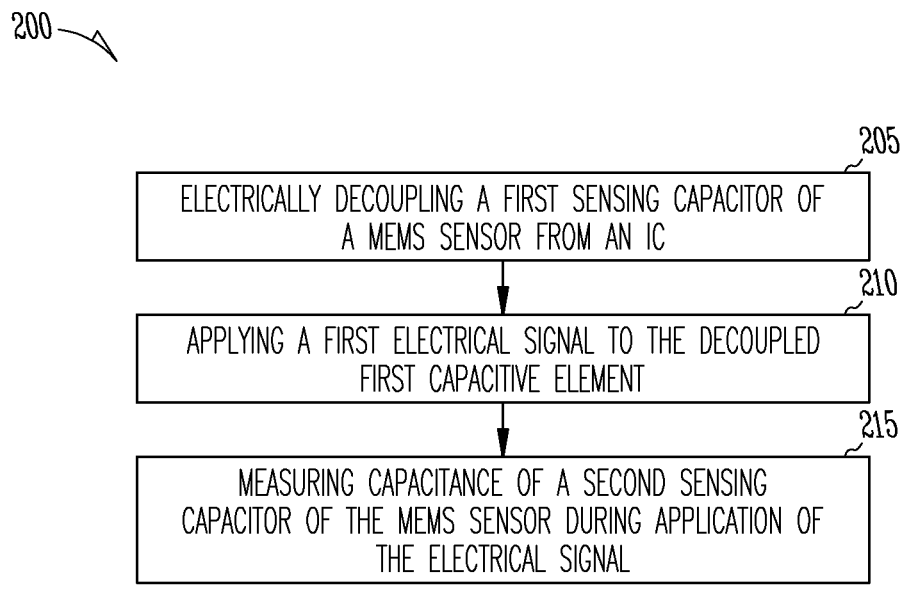
FIG. 2 is a flow diagram of an example of a method of implementing self test of a MEMS sensor.

FIG. 2 is a flow diagram of an example of a method 200 of implementing self test of a MEMS gyroscope sensor. In a normal operating mode, the MEMS gyroscope sensor is electrically coupled to an IC (e.g., an application specific integrated circuit or ASIC) as in FIG. 1. The IC measures capacitance of the Coriolis sensing capacitors at the output of the MEMS gyroscope sensor in the normal mode.

At block 205, a first Coriolis sensing capacitor of the MEMS sensor is electrically decoupled from the IC in a test mode. At block 210, a first electrical signal is applied to the decoupled capacitive element. Application of the first electrical signal can cause the proof mass to move and change the capacitance of the second sensing capacitor, which is measured at block 215. In this way, the interaction of movement of the proof mass and the change in capacitance of the second sensing capacitor can be tested without having to provide rotational force to the MEMS gyroscope sensor. The first Coriolis sensing capacitor can be measured similarly.

Returning to FIG. 1, the IC 110 includes a switch circuit (not shown). The switch circuit can operate in a normal mode and in a test mode. In the normal operating mode, the switch circuit can couple the first and second Coriolis sensing capacitors Cgp and Cgn of the MEMS sensor 105 as a capacitive element pair. The capacitive element pair changes capacitance in response to a Coriolis effect acting on the MEMS sensor. In the test mode, the switch circuit provides access to one or more of the Coriolis sensing capacitors.

Figure 3:
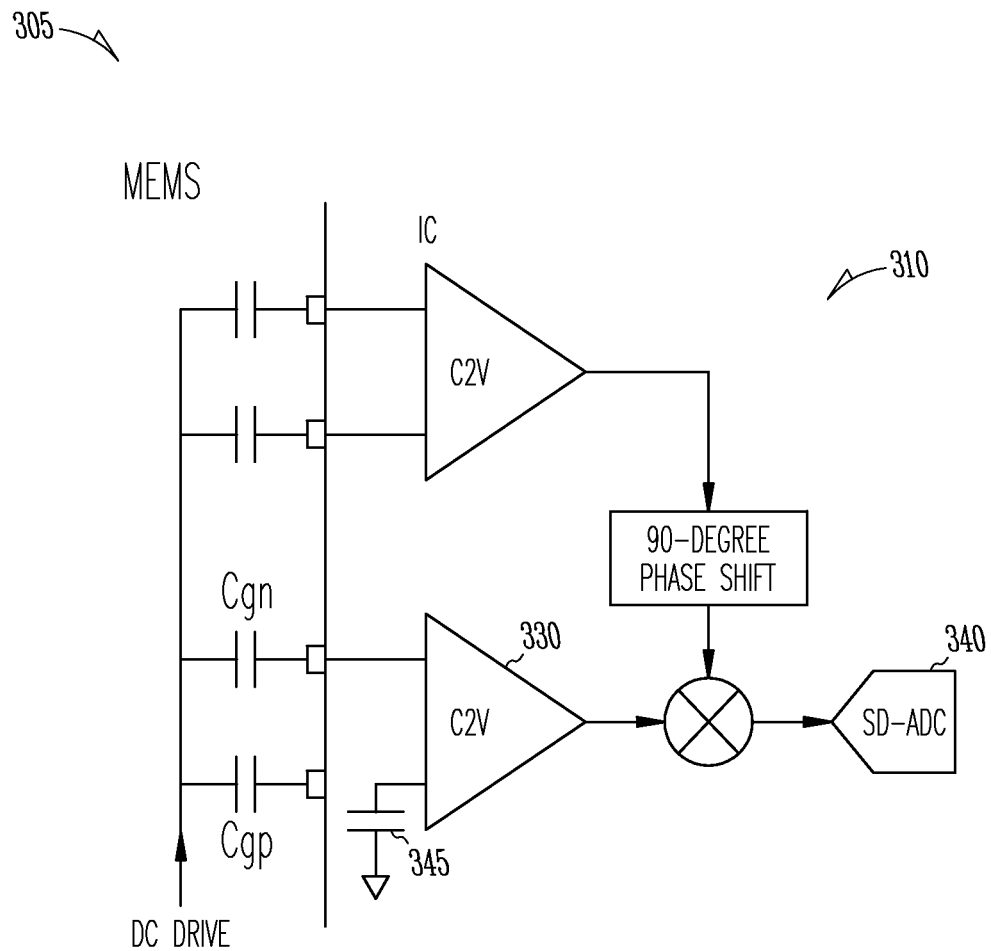
FIG. 3 is an illustration of an example of a circuit to test a MEMS sensor.

FIG. 3 shows portions of an example of the MEMS gyroscope sensor 305 and the IC 310 in the test mode. The switch circuit can electrically decouple the first sensing capacitor Cgp of the MEMS gyroscope sensor 305 from a first input of the IC and electrically couple the second sensing capacitor Cgn to a second input of the IC 310. As shown in the Figure, the first sensing capacitor Cgp may be electrically decoupled from the bottom C2V sensor circuit 330. The switch circuit may connect an internal capacitor 345 to the bottom C2V sensor circuit 330.

An electrical test signal can be applied to the decoupled first sensing capacitor Cgp, such as by a testing circuit (not shown) or testing platform. In some examples, the electrical signal is a sinusoidal signal. In some examples, the MEMS gyroscope sensor can include an electrical contact to contact the proof mass of the MEMS gyroscope sensor. As shown in FIG. 3 a direct current (DC) drive voltage can be applied to the proof mass via the electrical contact during application of the electrical test signal. The electrical test signal and the DC drive voltage provide electrostatic drive to move the proof mass to emulate a change in angular rate. The capacitance of the second sensing capacitor Cgn is measured while electrostatically driving the proof mass.

The IC 310 also includes a capacitance measurement circuit that measures capacitance of the second capacitive element of the MEMS sensor. The capacitance measurement circuit includes the bottom C2V sensor 330 and the ADC circuit 340. The C2V sensor circuit 330 senses a voltage representative of the capacitance of the second sensing capacitor, and the ADC circuit 340 produces a digital value representative of capacitance of the second capacitive element. The capacitance measurement circuit measures capacitance of the second sensing capacitor of the MEMS gyroscope sensor during application of the electrical signal to the decoupled first capacitive element.

The capacitance of the first sensing capacitor Cgp can be measured similarly. The first switch circuit can electrically decouple the second sensing capacitor Cgn of the MEMS gyroscope sensor from the second input of the IC and electrically couple the first sensing capacitor Cgp of the MEMS gyroscope sensor to the first input of the IC. The capacitance measurement circuit is configured to measure capacitance of the first sensing capacitor Cgn during application of a second electrical signal to the decoupled second sensing capacitor Cgn.

As explained previously herein, the electrical test signals can be sinusoidal signals. In some examples, a sinusoidal test signal is used and the capacitances are measured at different phase shifts of the sinusoidal signal. For instance, to test the second sensing capacitor Cgn, a first sinusoidal electrical signal having a first phase shift value (e.g., 0° of phase shift) can be applied to the first sensing capacitor Cgp. The capacitance of the second sensing capacitor Cgn can be measured during application of the first sinusoidal signal with the first phase shift value.

The phase shift value of the first sinusoidal electrical signal may then be changed to a second phase shift value (e.g., 90° of phase shift). The capacitance of the second sensing capacitor Cgn can be re-measured during application of the first sinusoidal signal with the second phase shift value. The capacitance of the sensing capacitors can also be measured at other values of phase shift (e.g., 180° and 270°).

Figure 4:
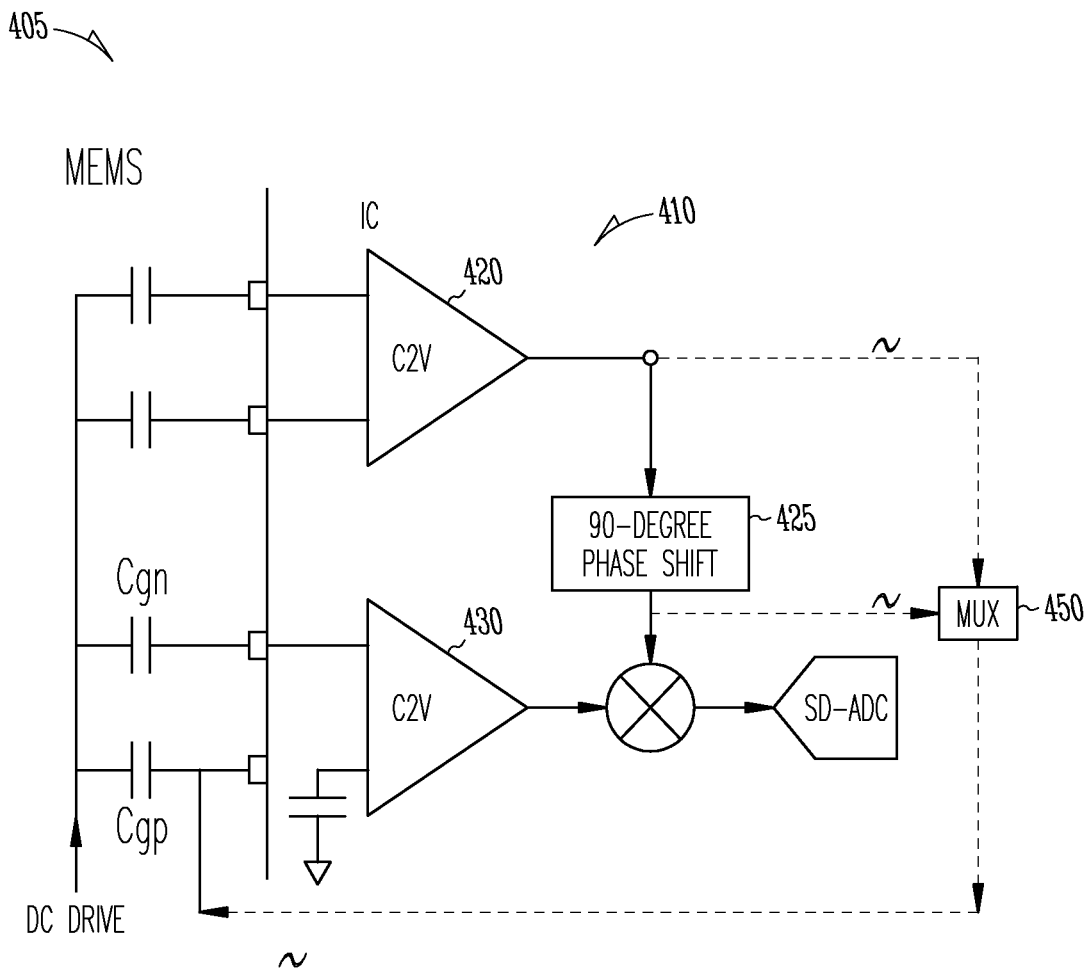
FIG. 4 is an illustration of another example of a circuit to test a MEMS sensor.

FIG. 4 shows portions of another example of the MEMS gyroscope sensor 405 and the IC 410 in the test mode. The top C2V sensor 420 circuit converts an oscillating capacitance of the MEMS gyroscope sensor to an oscillating voltage signal. The switch circuit can then apply the oscillating voltage signal as an electrical test signal to measure capacitance of a Coriolis sensing capacitor (e.g., sensing capacitor Cgn as shown in the Figure).

As explained previously herein, the IC 405 includes a significant portion of the gyro drive loop. In some examples, the IC 410 includes a self-starting oscillator circuit to provide a random "initial kick" to the gyro drive loop with a self-generated oscillating signal. The self-generated oscillating signal can be a substantially sinusoidal signal with a frequency different (e.g., a lower frequency) from the resonance frequency of the MEMS gyroscope sensor 405. The energy of this initial signal is gathered and causes the MEMS gyroscope sensor 405 to a resonance state at which point the mechanical oscillation of the MEMS gyroscope sensor becomes locked to the MEMS oscillation frequency.

The gyro drive loop locks to the MEMS oscillation frequency. The oscillation is sensed by the drive sense capacitors Cgsp and Cgsn, and the oscillation amplitude of the voltage signal generated by the top C2V sensor circuit 420 begins to grow. The amplitude of the voltage signal will keep growing until a threshold is crossed (e.g., 97% of target oscillation amplitude). When the threshold amplitude is satisfied, the AGC circuit selects the voltage signal from the top C2V sensor 420 as the reference signal to drive the MEMS gyroscope sensor instead of the self-generated oscillating signal. The AGC loop begins to regulate the gain of the output driver such that the target amplitude of oscillation is maintained.

As explained previously herein, the gyro drive loop includes a phase shift circuit 425 on the IC. The phase shift circuit 425 shifts the phase of the oscillating voltage signal from the top C2V sensor circuit 420. In certain examples, the phase shift circuit 425 provides 90° of phase shift. The switch circuit can apply the phase-shifted oscillating voltage signal to a sensing capacitor as an electrical test signal. In certain examples, the sensing capacitor that receives the electrical signal (e.g., Cgn) is decoupled from the bottom C2V sensor circuit 430 but remains in electrical contact with the IC 410 to receive the electrical test signal.

According to some examples, the switch circuit includes a multiplexer or MUX circuit 450 to selectively provide an electrical test signal with a phase shift of 0° or 90° to a sensing capacitor. To generate phase shifts of 180° and 270°, the switch circuit may invert the signal from the top C2V circuit 420 to provide 180° phase shift and use the phase shift circuit 425 to generate 270° of phase shift. In certain examples, the switch circuit can apply the original voltage signals to the other sensing capacitor (e.g., Cgp instead of Cgn) to generate phase shifts of 180° and 270°.

According to some examples, the first and second sensing capacitors Cgp, Cgn are configured to sense a Coriolis effect along a first axis (e.g., an X axis) of the MEMS gyroscope sensor. A MEMS gyroscope sensor may include a second sensing capacitor pair to sense a Coriolis effect along a second axis (e.g., a Y axis), and may include a third sensing capacitor pair to sense a Coriolis effect along a third axis (e.g., a Z axis).

The capacitance measurement circuit may measure capacitance of at least one additional sensing capacitor configured to sense the Coriolis effect along a second axis or third axis of the MEMS gyroscope sensor. For example, the IC of one or more of FIGS. 3 and 4 may include a C2V sensor circuit for drive sense capacitors and Coriolis sensing capacitors for at least a second axis or third axis. The switch circuit applies an electrical test signal to one or more sensing capacitors and the capacitance measurement circuit measures the capacitance of the sensing capacitors during application of the electrical test signal.

Note that only capacitive elements of the MEMS gyroscope sensor that are used for sensing the Coriolis effect are used in the testing, and that the MEMS gyroscope sensor does not require additional test capacitors. This results in less circuit components and less circuit contacts being required for the MEMS sensor, which simplifies its design.

ADDITIONAL NOTES AND EXAMPLES

Example 1 can include subject matter (such as an apparatus) comprising a micro-electromechanical system (MEMS) gyroscope sensor and an IC. The MEMs gyroscope sensor includes a first sensing capacitor and a second sensing capacitor. The IC includes a switch circuit configured to electrically decouple the first sensing capacitor from a first input of the IC and electrically couple the second sensing capacitor to a second input of the IC, and a capacitance measurement circuit configured to measure capacitance of the second sensing capacitor of the MEMS gyroscope sensor during application of a first electrical signal to the decoupled first capacitive element.

Example 2 can include, or can optionally be combined with the subject matter of Example 1 to optionally include, first and second sensing capacitors configured to sense a Coriolis effect of the MEMS gyroscope sensor in a normal operating mode.

Example 3 can include, or can optionally be combined with the subject matter of one or any combination of Examples 1 and 2 to optionally include, a switch circuit is configured to electrically decouple the second sensing capacitor of the MEMS gyroscope sensor from the second input of the IC and electrically couple the first sensing capacitor of the MEMS gyroscope sensor to the first input of the IC. The capacitance measurement circuit is optionally configured to measure capacitance of the first sensing capacitor of the MEMS gyroscope sensor during application of a second electrical signal to the decoupled second sensing capacitor.

Example 4 can include, or can optionally be combined with the subject matter of one or any combination of Examples 1-3 to optionally include, applying a first sinusoidal electrical signal to the first sensing capacitor, wherein the first sinusoidal electrical signal has a first phase shift, measuring capacitance of the second sensing capacitor during application of the first sinusoidal signal with the first phase shift, changing the phase shift of the first sinusoidal electrical signal to a second phase shift, and re-measuring capacitance of the second sensing capacitor during application of the first sinusoidal signal with the second phase shift.

Example 5 can include, or can optionally be combined with the subject matter of one or any combination of Examples 1-4 to optionally include, a capacitance-to-voltage sensor circuit configured to sense a voltage representative of the capacitance of the second sensing capacitor, and an analog-to-digital converter (ADC) circuit configured to produce a digital value representative of capacitance of the second capacitive element.

Example 6 can include, or can optionally be combined with the subject matter of one or any combination of Examples 1-5 to optionally include, a capacitor-to voltage sensor configured to convert an oscillating capacitance of the MEMS gyroscope sensor to an oscillating voltage signal, and the switch circuit is optionally configured to apply the oscillating voltage signal as the first electrical signal.

Example 7 can include, or can optionally be combined with the subject matter of Example 6 to optionally include, a phase shift circuit configured to shift the phase of the oscillating voltage signal, and the switch circuit is optionally configured to apply the phase-shifted oscillating voltage signal as the first electrical signal.

Example 8 can include, or can optionally be combined with the subject matter of one or any combination of Examples 1-7 to optionally include, a testing circuit configured to apply a direct current (DC) voltage to a proof mass of the MEMS gyroscope sensor during application of the first electrical signal.

Example 9 can include, or can optionally be combined with the subject matter of one or any combination of Examples 1-8 to optionally include, first and second sensing capacitors configured to sense a Coriolis effect along a first axis of the MEMS gyroscope sensor, and the capacitance measurement circuit is optionally configured to measure capacitance of at least one additional sensing capacitor configured to sense the Coriolis effect along a second axis of the MEMS gyroscope sensor.

Example 10 can include, or can optionally be combined with the subject matter of one or any combination of Examples 1-9 to optionally include, a MEMS gyroscope sensor that includes a movable proof mass, the first and second sensing capacitors are optionally configured to sense a Coriolis effect of the proof mass when the IC operates in a normal operating mode, application of the first electrical signal to the decoupled first capacitive element is optionally configured to move the proof mass during the test mode, and the IC is optionally configured to measure capacitance of the second sensing capacitor during movement of the proof mass in the test mode.

Example 11 can include, or can optionally be combined with the subject matter of one or any combination of Examples 1-10 to include, subject matter (such as a method, a means for performing acts, or a machine readable medium including instructions that, when performed by the machine, can cause the machine to perform acts) comprising electrically decoupling a first sensing capacitor of an MEMS gyroscope sensor from an IC, applying a first electrical signal to the decoupled first sensing capacitor, and measuring capacitance of a second sensing capacitor of the MEMS sensor during application of the first electrical signal.

Example 12 can include, or can optionally be combined with the subject matter of Example 11 to optionally include sensing a Coriolis effect of the MEMS gyroscope sensor using the first and second sensing capacitors in a normal operating mode.

Example 13 can include, or can optionally be combined with the subject matter of one or any combination of Examples 11 and 12 to include, electrically decoupling the second sensing capacitor of the MEMS sensor from the IC, applying a second electrical signal to the second sensing capacitor, and measuring capacitance of the first sensing capacitor of the MEMS gyroscope sensor during application of the second electrical signal.

Example 14 can include, or can optionally be combined with the subject matter of one or any combination of Examples 11-13 to optionally include, applying a first sinusoidal electrical signal to the first sensing capacitor, wherein the first sinusoidal electrical signal has a first phase shift, measuring capacitance of the second capacitor during application of the first sinusoidal signal with the first phase shift, changing the phase shift of the first sinusoidal electrical signal to a second phase shift, and re-measuring capacitance of the second capacitor during application of the first sinusoidal signal with the second phase shift.

Example 15 can include, or can optionally be combined with the subject matter of one or any combination of Examples 11-14 to include, sensing a voltage representative of the capacitance of the second sensing capacitor, and producing a digital value representative of capacitance of the second capacitive element using an ADC circuit.

Example 16 can include, or can optionally be combined with the subject matter of one or any combination of Examples 11-15 to include, receiving an oscillating signal from the MEMS gyroscope sensor at a third input to the IC, and applying the oscillating signal from the MEMS gyroscope sensor as the first electrical signal.

Example 17 can include, or can optionally be combined with the subject matter of Example 16 to optionally include, shifting the phase of the oscillating signal from the MEMS gyroscope sensor, and applying the phase-shifted oscillating signal as the first electrical signal.

Example 18 can include, or can optionally be combined with the subject matter of one or any combination of Examples 11-17 to optionally include, applying a DC voltage to a proof mass of the MEMS gyroscope sensor during application of the first electrical signal.

Example 19 can include, or can optionally be combined with the subject matter of one or any combination of Examples 11-18 to optionally include, sensing a Coriolis effect along a first axis of the MEMS gyroscope sensor using the first and second sensing capacitors, and measuring a capacitance of at least one additional sensing capacitor configured to sense the Coriolis effect along a second axis of the MEMS gyroscope sensor.

Example 20 can include, or can optionally be combined with the subject matter of one or any combination of Examples 11-19 to optionally include sensing a Coriolis effect of a proof mass of the MEMS gyroscope sensor using the first and second sensing capacitors in a normal operating mode of the MEMS gyroscope sensor, applying the first electrical signal to the decoupled first sensing capacitor to move a proof mass of the MEMS gyroscope sensor during a test mode of the MEMS gyroscope sensor, and measuring capacitance of the second sensing capacitor includes measuring capacitance of the second sensing capacitor of the MEMS gyroscope sensor during movement of the proof mass in the test mode.

Example 21 can include, or can optionally be combined with any portion or combination of portions of any one or more of Examples 1-20 to include, subject matter that can include means for performing any one or more of the functions of Examples 1-20, or a machine readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. The above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   a micro-electromechanical system (MEMS) gyroscope sensor including a first sensing capacitor and a second sensing capacitor; and
   an integrated circuit (IC), including:
      a switch circuit configured to electrically decouple the first sensing capacitor from a first input of the IC and electrically couple the second sensing capacitor to a second input of the IC; and
      a capacitance measurement circuit configured to measure a capacitance of the second sensing capacitor of the MEMS gyroscope sensor during application of a first electrical signal to the decoupled first capacitive element.

2. The apparatus of claim 1, wherein the first and second sensing capacitors are configured to sense a Coriolis effect of the MEMS gyroscope sensor in a normal operating mode.

3. The apparatus of claim 2, wherein the switch circuit is configured to:
   electrically decouple the second sensing capacitor of the MEMS gyroscope sensor from the second input of the IC and electrically couple the first sensing capacitor of the MEMS gyroscope sensor to the first input of the IC; and
   wherein the capacitance measurement circuit is configured to measure capacitance of the first sensing capacitor of the MEMS gyroscope sensor during application of a second electrical signal to the decoupled second sensing capacitor.

4. The apparatus of claim 1, wherein applying a first electrical signal includes:
   applying a first sinusoidal electrical signal to the first sensing capacitor, wherein the first sinusoidal electrical signal has a first phase shift;
   measuring capacitance of the second sensing capacitor during application of the first sinusoidal signal with the first phase shift;
   changing the phase shift of the first sinusoidal electrical signal to a second phase shift; and
   re-measuring capacitance of the second sensing capacitor during application of the first sinusoidal signal with the second phase shift.

5. The apparatus of claim 1, wherein the IC includes:
   a capacitance-to-voltage sensor circuit configured to sense a voltage representative of the capacitance of the second sensing capacitor; and
   an analog-to-digital converter (ADC) circuit configured to produce a digital value representative of the capacitance of the second sensing capacitor.

6. The apparatus of claim 1, wherein the IC includes:
   a capacitor-to voltage sensor configured to convert an oscillating capacitance of the MEMS gyroscope sensor to an oscillating voltage signal, and
   wherein the switch circuit is configured to apply the oscillating voltage signal as the first electrical signal.

7. The apparatus of claim 6,
   wherein the IC includes a phase shift circuit configured to shift a phase of the oscillating voltage signal; and
   wherein the switch circuit is configured to apply the phase-shifted oscillating voltage signal as the first electrical signal.

8. The apparatus of claim 1, including a testing circuit configured to apply a direct current (DC) voltage to a proof mass of the MEMS gyroscope sensor during application of the first electrical signal.

9. The apparatus of claim 1, wherein the first and second sensing capacitors are configured to sense a Coriolis effect along a first axis of the MEMS gyroscope sensor, and wherein the capacitance measurement circuit is configured to measure a capacitance of at least one additional sensing capacitor configured to sense the Coriolis effect along a second axis of the MEMS gyroscope sensor.

10. The apparatus of claim 1, wherein the MEMS gyroscope sensor includes a movable proof mass, wherein the first and second sensing capacitors are configured to sense a Coriolis effect of the proof mass when the IC operates in a normal operating mode, wherein application of the first electrical signal to the decoupled first capacitive element is configured to move the proof mass during a test mode, and wherein the IC is configured to measure the capacitance of the second sensing capacitor during movement of the proof mass in the test mode.

11. A method comprising:
   electrically decoupling a first sensing capacitor of an MEMS gyroscope sensor from an IC;
   applying a first electrical signal to the decoupled first sensing capacitor; and
   measuring a capacitance of a second sensing capacitor of the MEMS gyroscope sensor during application of the first electrical signal.

12. The method of claim 11, including sensing a Coriolis effect of the MEMS gyroscope sensor using the first and second sensing capacitors in a normal operating mode.

13. The method of claim 11, including:
   electrically decoupling the second sensing capacitor of the MEMS sensor from the IC;
   applying a second electrical signal to the second sensing capacitor; and
   measuring capacitance of the first sensing capacitor of the MEMS gyroscope sensor during application of the second electrical signal.

14. The method of claim 11, wherein applying a first electrical signal includes:
   applying a first sinusoidal electrical signal to the first sensing capacitor, wherein the first sinusoidal electrical signal has a first phase shift;
   measuring capacitance of the second capacitor during application of the first sinusoidal signal with the first phase shift;
   changing the phase shift of the first sinusoidal electrical signal to a second phase shift; and
   re-measuring capacitance of the second capacitor during application of the first sinusoidal signal with the second phase shift.

15. The method of claim 11, wherein measuring capacitance includes:
   sensing a voltage representative of the capacitance of the second sensing capacitor; and
   producing a digital value representative of the capacitance of the second sensing capacitor using an analog-to-digital converter (ADC) circuit.

16. The method of claim 11, including:
   receiving an oscillating signal from the MEMS gyroscope sensor at a third input to the IC,
   wherein applying the first electrical signal includes applying the oscillating signal from the MEMS gyroscope sensor as the first electrical signal.

17. The method of claim 16, wherein applying the first electrical signal includes:
   shifting a phase of the oscillating signal from the MEMS gyroscope sensor; and
   applying the phase-shifted oscillating signal as the first electrical signal.

18. The method of claim 11, including applying a direct current (DC) voltage to a proof mass of the MEMS gyroscope sensor during application of the first electrical signal.

19. The method of claim 11, wherein the first and second sensing capacitors are configured to sense a Coriolis effect along a first axis of the MEMS gyroscope sensor, and wherein the method further includes measuring a capacitance of at least one additional sensing capacitor configured to sense the Coriolis effect along a second axis of the MEMS gyroscope sensor.

20. The method of claim 11, including:
   sensing a Coriolis effect of a proof mass of the MEMS gyroscope sensor using the first and second sensing capacitors in a normal operating mode of the MEMS gyroscope sensor;
   wherein applying the first electrical signal includes applying the first electrical signal to the decoupled first sensing capacitor to move the proof mass of the MEMS
gyroscope sensor during a test mode of the MEMS gyroscope sensor; and wherein measuring the capacitance of the second sensing capacitor includes measuring the capacitance of the second sensing capacitor of the MEMS gyroscope sensor during movement of the proof mass in the test mode.

* * * * *